Sept. 25, 1951          L. N. LAUER          2,569,012

INTERNALLY EXPANDING BRAKE ACTUATOR

Filed July 12, 1945          4 Sheets-Sheet 1

INVENTOR.
LEON N. LAUER
BY
ATTORNEY

INVENTOR.
LEON N. LAUER
BY
T.J. Plante
ATTORNEY

Sept. 25, 1951 L. N. LAUER 2,569,012
INTERNALLY EXPANDING BRAKE ACTUATOR
Filed July 12, 1945 4 Sheets-Sheet 3

INVENTOR.
LEON N. LAUER
BY
T. J. Plante
ATTORNEY

Sept. 25, 1951 L. N. LAUER 2,569,012
INTERNALLY EXPANDING BRAKE ACTUATOR
Filed July 12, 1945 4 Sheets-Sheet 4

INVENTOR.
LEON N. LAUER
BY
T. J. Plante
ATTORNEY

Patented Sept. 25, 1951

2,569,012

UNITED STATES PATENT OFFICE 2,569,012

INTERNALLY EXPANDING BRAKE ACTUATOR

Léon Nicolas Lauer, Clichy, France, assignor to Bendix Aviation Corporation, New York, N. Y.

Application July 12, 1945, Serial No. 604,623
In France March 25, 1943

Section 1, Public Law 690, August 8, 1946
Patent expires March 25, 1963

9 Claims. (Cl. 188—78)

The invention relates to brakes and more particularly to brake applying means including an operating wedge for setting into action wheel brake assemblies on automotive vehicles.

In brake assemblies which include an operating wedge that acts on the brake shoes through the intermediary of rollers, and particularly in application to heavy vehicles, it has been found that, due to the magnitude of the braking effort exerted, the load on the rollers reaches an excessive value.

One object of the invention is to reduce the stress exerted on the rollers by inserting a reduction means between the operating wedge and the rollers.

Another object of the invention is to provide a brake in which the effort applied to the brake-energizing assembly is kept within limits consistent with safe operation thereof and is transmitted with mechanical advantage to the brake shoes.

A further object of the invention is to realize a floating brake applying means that acts with mechanical advantage on the brake shoes and is adapted, in spite of the unequal degree of wear which may occur on the linings, to press said shoes efficiently against the drum.

Still another object of the invention is to provide a brake in which the applying effort acts through the intermediary of a system of levers pivoted on the fixed support of the brake and amplifying the effort transmitted to the brake shoes.

Yet another object of the invention is to provide a brake applying means in which the operating wedge acts on a brake shoe through the intermediary of a roller supported at one end of a lever, the opposite end of which is pivoted on the fixed support of the brake, a point selected between the ends of said lever acting as a fulcrum for a member operating said brake shoe.

Another feature of the invention is to provide adjusting means located between the brake applying mechanism and the respective brake shoes, which means includes two bevelled members co-operating one with the other and operated by a pin which acts on one of said members and is locked by a spring loaded pawl meshing with locking teeth provided on this latter bevelled member.

Other objects and advantages of the invention will appear from the following description taken in connection with the drawing forming a part of this specification, and in which.

Figure 1:
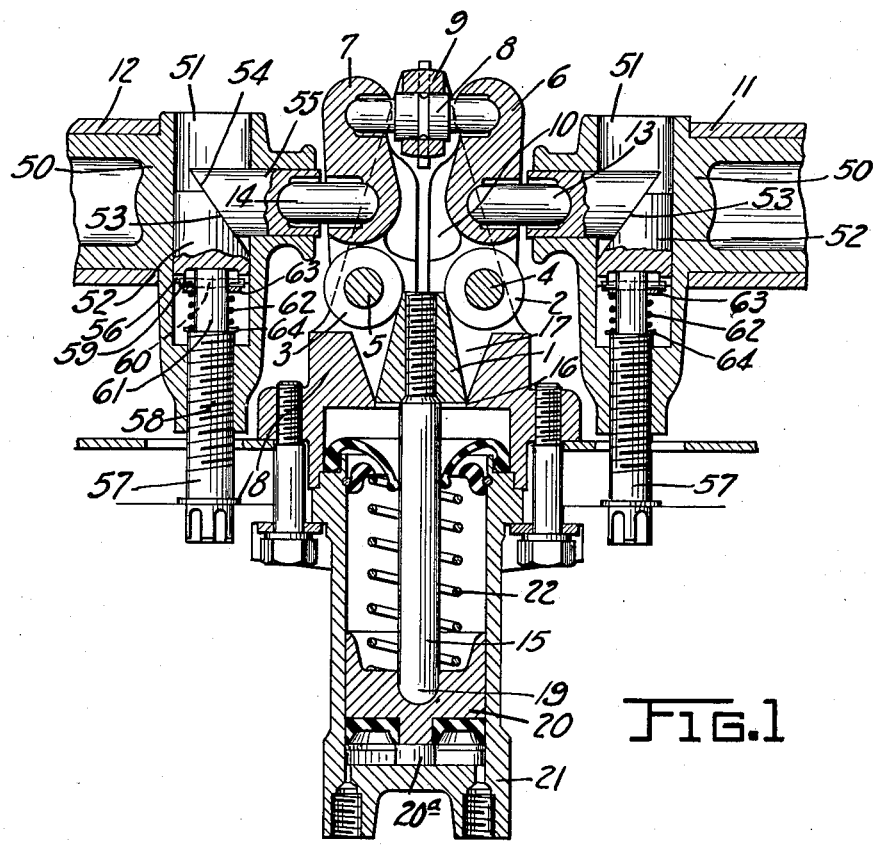
Fig. 1 is a sectional view of one embodiment of the invention, with a hydraulically operated applying means.

On Fig. 1 is shown an operating wedge 1 acting on rollers 2 and 3 rotatably mounted by means of pins 4 and 5 on one end of rocking levers 6 and 7. These levers are pivoted at their other end on the spherical heads of a pin 8 secured on a transverse part 9 of the casing 10 in which the brake applying means is housed. The levers 6 and 7 act on the brake shoes 11 and 12, through the intermediary of plungers 13 and 14, the spherical heads of which are in operative connection with said levers in points located between the ends of said levers.

Figure 2:
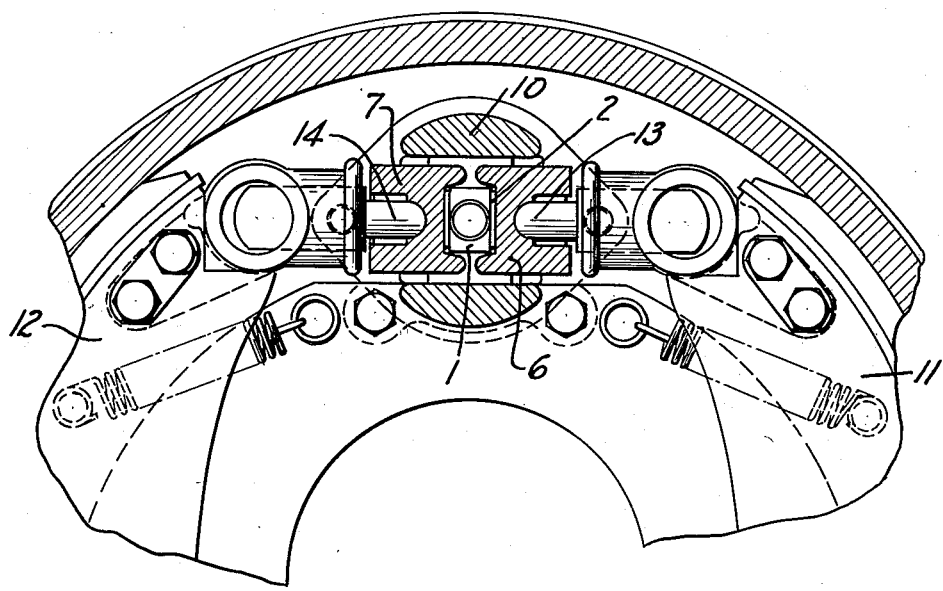
Fig. 2 is a fragmentary view in elevation of the applying means shown on Fig. 1.

In this construction, the effort applied to the rollers 2 and 3 by the operating wedge 1 to bring the brake shoes into contact with the drum is amplified by the system of levers 6 and 7 whereby for a given brake applying effort transmitted to the shoes, the load on the rollers is reduced in a ratio corresponding to the mechanical advantage of said system. To keep this load between reasonable limits, recourse is made to rollers and a wedge which have a sufficient width (see Fig. 2) to obtain a distribution of the effort on a sufficient area of said members. It is to be noted that due to the mounting of the rocking levers on spherical ends of the plungers, the levers are adapted to adjust their position in such a manner that the radius of the rollers is always normal to the operating surface of the wedge. Consequently, the wedge is in operating connection with the rollers on the entire width thereof and the pressure is distributed uniformly on the rollers.

In normal position, the base of the operating wedge takes support against a cylindrical part 16 on the lower end of a recess 17 of the casing element 18, thus bringing about a centering of the wedge when the latter is in normal position. When the brake is set into action, the operating wedge clears the cylindrical part 16 and the entire wedge-brake assembly becomes floating, thus enabling the brake shoes to effect movements of different magnitude, corresponding to different degree of wear of the linings. Furthermore, the floating arrangement of the applying assembly permits balancing of the efforts transmitted to the respective brake shoes.

The operating wedge 1 is mounted at one end of a rod 15 actuated by an applying means of any conventional type. The other end of the rod ends with a spherical head 19, which in the embodiment shown in the drawing, is pivoted on a piston 20 of a hydraulic wheel cylinder 21. The operating wedge is urged into normal position by the conventional brake shoe return-springs and the rod 15 is permanently in abutting connection with the piston 20. The latter is formed with a projection 20a which under the action of the spring 22 abuts against the head of the wheel cylinder 21. All the clearances which may exist in the brake applying means are thus taken up in normal position, thus eliminating any loss of the operating stroke.

Figure 3:
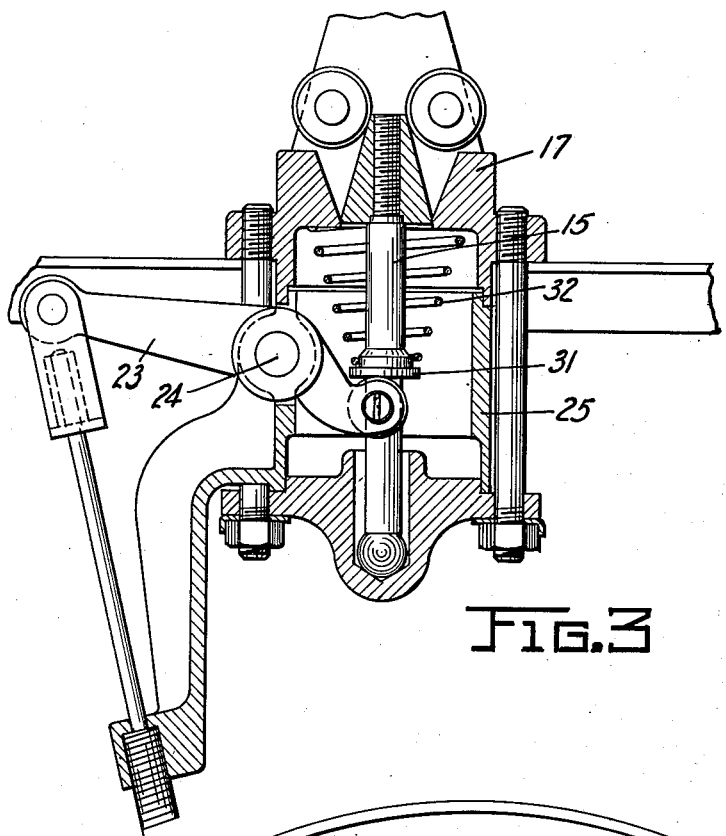
Fig. 3 is a view in section, certain parts being broken away, of an embodiment of the invention, in which the applying means is operated mechanically.
Figure 4:
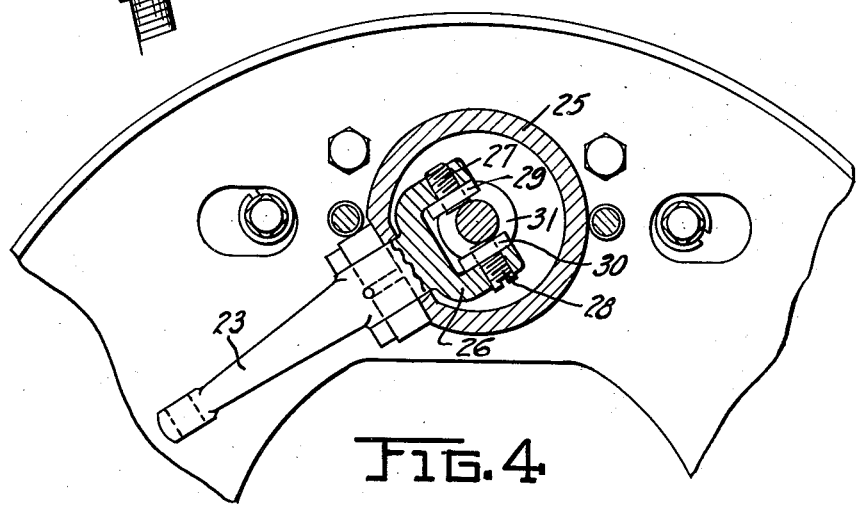
Fig. 4 is a section showing details of the mechanical applying means.

In Figs. 3 and 4, wherein elements similar to those of Fig. 1 are indicated by the same reference numerals, the hydraulic wheel cylinder is replaced by a mechanical applying means including a lever 23 pivoted by means of pin 24 on a casing element 25 and terminating in a fork 26 (Fig. 4). In this fork are mounted pins 27 and 28, on which are rotatably mounted rollers 29 and 30. The latter are in an operative connection with an annular shoulder 31 provided on the rod 15. A spring 32 located between the casing element 17 and the ring 31 tends to return the mechanical applying means to normal position. It will be noted that the casing element 25 acts as a housing for the actuating rod 15.

Figure 5:
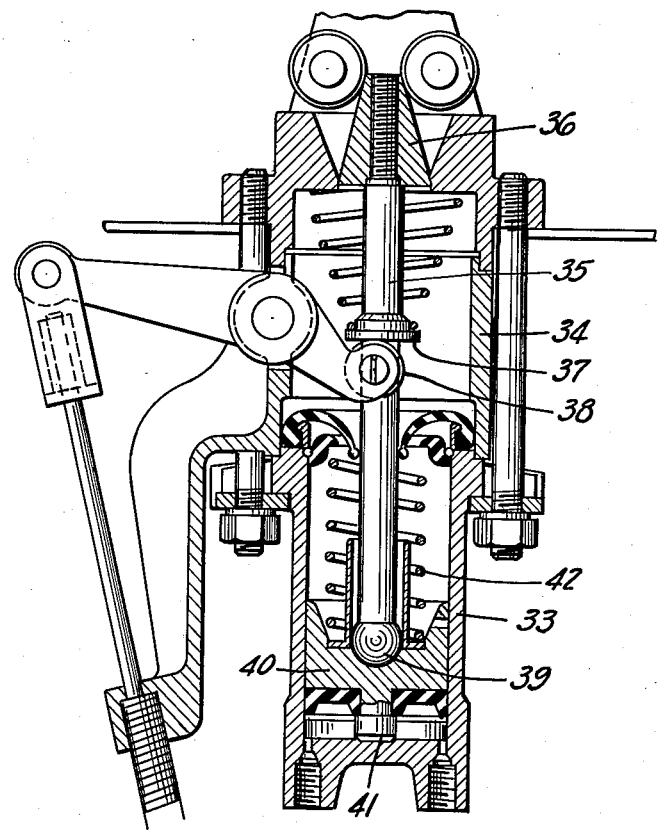
Fig. 5 is a view in section, some parts being broken away, of another embodiment of the invention in which the applying means is operated hydraulically and mechanically.

Fig. 5 shows a brake applying means with an operating wedge of the type shown in Fig. 1 adapted to be actuated hydraulically or mechanically. In this embodiment, the hydraulic wheel cylinder 33 is mounted at the end of a casing 34 which acts as a housing for the mechanical applying means, the latter having a structure similar to that described with reference to Figures 3 and 4.

The wedge actuating rod 35 is formed between its ends with an annular shoulder 37, and the rollers 38 of the mechanical applying means are in abutting connection with the shoulder. The rod terminates in a spherical head 39 located in a corresponding recess formed in the hydraulic piston 40. As in the embodiment shown in Fig. 1, the piston 40 is formed with a projection 41 which in normal position abuts against a head of the wheel cylinder 33 under the action of spring 42.

Figure 6:
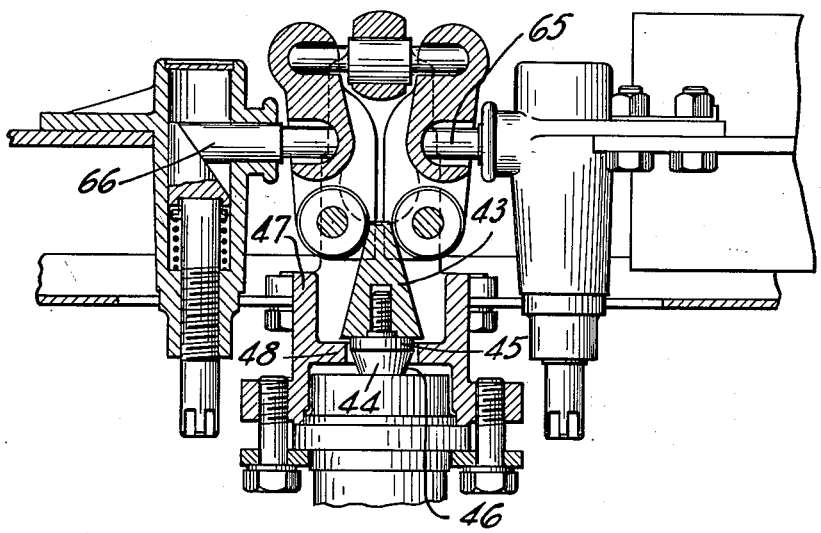
Fig. 6 shows another embodiment similar to that shown on Fig. 1.

Fig. 6 shows an embodiment which differs in some respects from the embodiment described with reference to Fig. 1. In Fig. 6, the centering of the operating wedge 43 in normal position is effected by a projection 44 on the wedge which projection is formed by a cylindrical member 45 and a tapered member 46. The brake applying effort is transmitted to member 46. In the casing 47 is provided a cylindrical bore 48, which, with the wedge in normal position, cooperates with the cylindrical member 45 of the projection 44. This construction as shown in Fig. 1, provides a floating arrangement of the wedge assembly as soon as the applying means is set into action.

Another feature of the invention is to provide a novel wear adjusting device which will be described now more fully with reference to Fig. 1.

Each of these devices is mounted at the end of the brake shoes 11, 12 in a prolongation 50 formed with a cylindrical recess 51. A cylindrical member 52, the diameter of which corresponds to that of the recess 51, is provided with a bevelled surface 53 adapted to cooperate with a corresponding bevelled surface 54 formed on a pin 55.

The inner face of the member 52 is provided with locking teeth 56. The adjusting pin 57 is formed with a threaded portion 58 cooperating with the prolongation 50 and the upper end of this pin comes into contact with the inner face of the member 52. A pawl 59 mounted with lost motion in a hole 60 provided in the upper smooth part of the adjusting pin 57 is maintained in engagement with the locking teeth 56 by a spring 62 compressed between two washers 63 and 64, mounted on this pin. By rotating the respective adjusting pin 57, the member 52 is caused to advance or to recede and due to the cooperation of the bevelled surfaces 53 and 54, the position of the brake shoes is thus adjusted with respect to the brake applying means and consequently with respect to the drum.

The arrangement of the adjusting means adjacent to the applying means provides an advantage in that the stress brought about in this structure is much smaller than that produced in an adjusting means located adjacent the anchor pins on which are articulated the brake shoes.

It will be noted that in the embodiment shown in Figure 6, the bevelled member 66 is integrally made with the plunger 65, instead of being pivoted one on the other as in Fig. 1.

In all the embodiments described above, the applying means is located in a plane perpendicular to the plane of the brake shoes. This is of particular interest in case of hydraulically operated brake systems since due to the outside location of the cylinder, it is protected from heat. It is obvious that the above improvements can also be embodied in applying means located in the plane of the brake shoes or having any other direction with respect to this plane.

While several illustrative embodiments have been described in detail, it is not my intention to limit the scope of the invention to those particular embodiments or otherwise than by the terms of the appended claims.

What I claim is:

1. For use in cooperation with a rotatable brake drum, a brake comprising a shoe, a fixed support, an operating wedge, a roller in operating connection with the wedge, a lever carrying said roller at one end and pivoted at its other end on the fixed support, and means connecting the midportion of said lever to the brake shoe.

2. For use in cooperation with a rotatable brake drum, a brake comprising a pair of shoes, a fixed support, an operating wedge, a pair of rollers in operative connection with the wedge, a pair of levers each carrying one of said rollers at one end and pivoted at the other end on the fixed support, and a pair of plungers each connecting one of the brake shoes to the respective lever at a point located between the ends of said lever.

3. For use in cooperation with a rotatable brake drum, a brake comprising a shoe, an operating wedge, a roller in operating connection with the wedge, a lever carrying the roller on one end and pivoted at the other end on the fixed support formed with a spherical recess between its ends, and a plunger connecting the lever to the brake shoe and formed with a spherical head cooperating with said recess.

4. For use in cooperation with a rotatable brake drum, a brake comprising a pair of shoes, a fixed support, an operating wedge, guiding means for restricting lateral movement of the wedge in released position, said wedge being arranged to clear the guiding means when the brake is applied.

5. For use in cooperation with a rotatable drum, a brake comprising a pair of shoes, an operating wedge, a pair of plungers each connecting said wedge to one of said shoes, and adjusting means carried by each shoe in cooperation with the respective plunger comprising a casing having a pair of perpendicular bores, and a reciprocable member in each of said bores having complementary meeting faces, one of said members being operatively connected to one of said plungers, the other of said members being adjustably secured in position in said casing.

6. For use in cooperation with a rotatable drum, a brake comprising a pair of shoes, an operating wedge, a pair of plungers each connecting said wedge to one of said shoes, and adjusting means carried by each shoe in cooperation with the respective plunger comprising a casing having a pair of perpendicular bores, a reciprocable member in each of said bores having complementary meeting faces, one of said members being operatively connected to one of said plungers, the end of the other of said members being provided with serrations, a pin adjustably secured to said casing having a pawl on one end in cooperative engagement with said serrations, said pin being operable to cause its respective member to slide on the face of the member connected to said plunger.

7. For use in cooperation with a rotatable brake drum, a brake comprising a pair of shoes, a fixed support, an operating wedge, a pair of rollers in operative connection with the wedge, a pair of levers each carrying one of said rollers at one end and pivoted at the other end on the fixed support, a pair of plungers each connecting one of the brake shoes to the respective lever at a point located between the ends of said lever, guide means centrally supporting said wedge, and wedge actuation means carried by said guide means.

8. For use in cooperation with a rotatable brake drum, a brake comprising a pair of shoes, a fixed support, an operating wedge, a pair of rollers in operative connection with the wedge, a pair of levers each carrying one of said rollers at one end and pivoted at the other end on the fixed support, a pair of plungers each connecting one of the brake shoes to the respective lever at a point located between the ends of said lever, guide means centrally supporting said wedge, a thrust rod secured to said wedge pivotally carried in said guide means, a collar secured to said thrust rod between its ends, a lever having a friction reducing element on one end in engagement with said collar pivotally connected to said guide means, and actuating means associated with said lever operable to cause said friction reducing element to bear against said collar to move said wedge into engagement with said rollers.

9. For use in cooperation with a rotatable brake drum, a brake comprising a pair of shoes, a fixed support, an operating wedge, a pair of rollers in operative connection with the wedge, a pair of levers each carrying one of said rollers at one end and pivoted at the other end on the fixed support, a pair of plungers each connecting one of the brake shoes to the respective lever at a point located between the ends of said lever, guide means centrally supporting said wedge, a thrust rod secured to said wedge pivotally carried in said guide means, a collar secured to said thrust rod between its ends, a lever having a friction reducing element on one end in engagement with said collar pivotally connected to said casing, actuating means associated with the other end of said lever operable to cause said friction reducing element to bear against said collar to move said wedge into engagement with said rollers, and a fluid responsive member operatively connected to the end of said thrust rod remote from said wedge to move said wedge into engagement with said rollers.

LÉON NICOLAS LAUER.

REFERENCES CITED

The following references are of record in the file of this patent:

UNITED STATES PATENTS

| Number | Name | Date |
| --- | --- | --- |
| 1,751,646 | Nieman | Mar. 25, 1930 |
| 1,998,659 | Dodge | Apr. 23, 1935 |
| 2,009,179 | Hersot | July 23, 1935 |
| 2,049,628 | Rowland et al. | Aug. 4, 1936 |
| 2,082,334 | Harcourt | June 1, 1937 |
| 2,154,075 | Riedel | Apr. 11, 1939 |
| 2,158,818 | Franchi | May 16, 1939 |
| 2,165,760 | Parnell | July 11, 1939 |
| 2,238,361 | Gates | Apr. 15, 1941 |
| 2,372,319 | Francois | Mar. 27, 1945 |
| 2,380,815 | Whitacre | July 31, 1945 |